United States Patent [19]

Sano et al.

[11] Patent Number: 5,441,813
[45] Date of Patent: Aug. 15, 1995

[54] COMMUNICATION LINE MATERIAL

[75] Inventors: Hiroaki Sano; Tatsuya Kakuta; Toru Yamanishi, all of Kanagawa, Japan

[73] Assignee: Sumitomo Electric Industries, Ltd., Osaka, Japan

[21] Appl. No.: 291,732

[22] Filed: Aug. 16, 1994

Related U.S. Application Data

[63] Continuation of Ser. No. 998,641, Dec. 30, 1992, abandoned, which is a continuation of Ser. No. 654,887, Feb. 13, 1991, abandoned.

[30] Foreign Application Priority Data

Feb. 16, 1990 [JP] Japan .................... 2-33866

[51] Int. Cl.$^6$ ............................ D02G 3/00
[52] U.S. Cl. .................... 428/375; 428/391; 428/392; 174/110 S; 174/110 F; 174/110 E; 385/128; 385/141
[58] Field of Search ............ 428/375, 391, 392, 390; 524/265; 525/121, 131; 523/218; 522/102; 385/128, 141, 100; 174/110 S, 110 F, 110 E

[56] References Cited

U.S. PATENT DOCUMENTS

| | | | |
|---|---|---|---|
| 3,479,811 | 11/1969 | Walters | 57/250 |
| 3,565,685 | 2/1971 | Suzuki | 428/384 |
| 3,843,568 | 10/1974 | Woodland et al. | 521/54 |
| 3,922,442 | 11/1975 | North et al. | 428/398 |
| 4,125,487 | 11/1978 | Olstowski | 525/131 |
| 4,265,972 | 5/1981 | Rudner | 428/375 |
| 4,303,736 | 12/1981 | Torobin | 521/54 |
| 4,324,453 | 4/1982 | Patel | 428/372 |
| 4,382,821 | 5/1983 | Davis et al. | 523/218 |
| 4,514,037 | 4/1985 | Bishop et al. | 428/375 |
| 4,522,465 | 6/1985 | Bishop et al. | 428/375 |
| 4,572,610 | 2/1986 | Krajewski | 428/375 |
| 4,608,409 | 8/1986 | Coady et al. | 428/375 |
| 4,642,265 | 2/1987 | Suzuki | 428/375 |
| 4,683,264 | 7/1987 | Urata et al. | 525/121 |
| 4,733,942 | 3/1988 | Hida et al. | 428/375 |
| 4,757,100 | 7/1988 | Wichelhaus et al. | 523/218 |
| 4,854,666 | 9/1989 | Kohara et al. | 385/128 |
| 4,877,306 | 10/1989 | Kar | 385/128 |
| 4,929,047 | 5/1990 | Dubots et al. | 428/378 |

*Primary Examiner*—N. Edwards
*Attorney, Agent, or Firm*—Cushman, Darby & Cushman

[57] ABSTRACT

The invention relates to coating composition, coated articles of manufacture, and to the formation of the coated articles. The coating is an energy-beam set resin containing fluid containing heat- expandable, fluid-encapsulating hollow spheres in the resin. The coating of a substrate, such as a communication line material, is accomplished by coating the material with a resin mixture containing expandable spheres and then exposing the coated material to an energy-beam source for a period of time to cure the resin and expand the spheres. The coating is applied to at least one filament of a communication line material. Such filaments can be gathered into bundles which are first extrusion coated with a thermoplastic polymer before being coated with the resin mixture. The composition of the resin material can be varied by changing the volume percent of the hollow spheres present in the resin mixture.

10 Claims, 2 Drawing Sheets

COMMUNICATION LINE MATERIAL

This is a continuation of application Ser. No. 07/998,641, filed on Dec. 30, 1992, now abandoned, which is a continuation of application Ser. No. 07/654,887, filed on Feb. 13, 1991, now abandoned.

BACKGROUND OF THE INVENTION

1. Field of Invention

The present invention relates to light weight energy-beam settable resin coating compositions, a method for forming such coatings, and articles of manufacture formed therefrom.

2. Description of Related Art

The air-blown fiber method, which is a new method of laying a communication line material, is disclosed, for example, in Japanese Patent Unexamined Publication No. Sho-59-104607. In such a method, a communication line material is sent by pressure so as to be laid into a duct line laid in advance, by means of an air flow, for example, by using a pressure-sending apparatus 31 shown in FIG. 3. Here, in the drawing, a feed head 34 is attached on an end portion of the duct line 32; drive wheels 35 and 36 send a communication line material 33; and an air lead-in inlet 37 leads in air for sending the communication line material 33 by pressure. Further, an air seal 38 prevents leakage of air from an inlet portion of the feed head 34 for the communication line material 33. The air seal 38 is provided because the duct line 32 is so long that there is a large loss of pressure.

It is necessary to make the communication line material 33 used in such a method light-weight and to make the surface area large so that the communication line material 33 can be efficiently sent by pressure created by an air flow. For this purpose, the configuration shown in FIG. 4 has been proposed.

In the communication line material 33 shown in FIG. 4, a bundle of seven optical fibers 41 are coated by a polypropylene layer 42, and the polypropylene layer 42 is coated with a foam polyethylene layer 43.

When foam polyethylene is used to form the foam polyethylene layer 43 of the communication line material 33, however, a problem results because the foam polyethylene is apt to be influenced by the cooling temperature, the temperature distribution in the inside of the extruded material, or dimensional variations in the under-layer to be coated. That is, there is a problem either because the degree of foaming of the foam polyethylene is apt to vary, thereby changing the outer diameter of the foam polyethylene layer 43, or because the thickness of the foam layer is apt to vary as a result of the circumferential temperature distribution in the die which extrudes the layer. As a result, for example, there is a problem of blocking at the portion of the air seal 38 of the pressure-sending apparatus.

Further, since the actual foaming of the foam polyethylene occurs gradually, an extended cooling period is necessary after performing the extrusion-coating with the foam polyethylene. Also, as shown in FIG. 5, it is necessary to provide a long cooling line 54 between a die 52 of an extruder 51 and a take-up machine 53. Thus the extended cooling process results in poor productivity.

Moreover, since there is little adhesion between the coating layer of a foam resin such as foam polyethylene and the under-layer, slippage results between the foam coating layer and the under-layer.

SUMMARY OF THE INVENTION

In view of the problems mentioned above, the present invention provides a communication line material which is light-weight, has a large surface area and decreased diameter variations, uses high quality materials, is readily produced, and is suitable for use in an air-blown fiber laying method or the like which lays a resin-coated communication line by passing it under fluid pressure through an existing duct.

In one embodiment, the invention comprises coated substrates formed from coatings comprising an energy-beam settable resin containing a plurality of heat expandable hollow spheres encapsulating a fluid.

In another embodiment, the invention comprises light weight articles of manufacture formed from substrates coated with a mixture of an energy-beam set resin and a plurality of heat expanded hollow spheres. In a further embodiment, the invention comprises coating a substrate, for example a filament, with an energy beam settable resin composition containing a plurality of heat expandable hollow spheres containing a fluid, and exposing the coated substrate to an energy beam source and a heat source to form a light weight coating on the substrate.

In a preferred embodiment, the coated substrate is subjected simultaneously to the energy-beam source, for example, ultraviolet, and the heat source, for example, an infrared beam.

BRIEF DESCRIPTION OF THE DRAWINGS

The diagrams (a), (b), and (c) of FIG. 1 are cross sections showing the communication line materials according to examples of the present invention.

DETAILED DESCRIPTION OF THE PREFERRED EMBODIMENTS

Figure 1A:
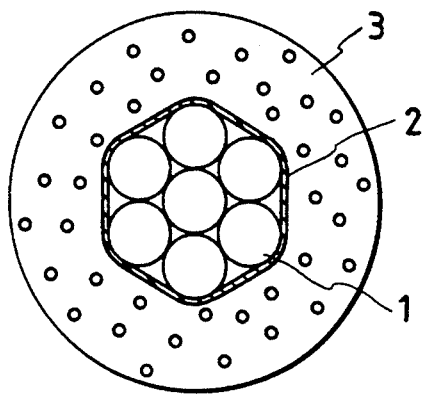

In order to attain the foregoing object, according to the present invention, the coated communication line material to be laid by sending it under pressure through an already laid duct line, is characterized in that the coating material comprises at least one coating layer formed of a composition of energy-beam setting resin in which fluid-encapsulating, hollow spheres are mixed.

The hollow spheres to be used according to the present invention may be any spheres so long as each of them encapsulates air or another gas or a liquid such as nitrogen, argon, isobutane, or the like, and has an outer shell portion made of thermoplastic resin such as a copolymer of vinylidene chloride and acrylate, polyethylene, fluororesin, or the like; thermosetting resin such as epoxy resin, phenol resin, urea resin, or the like; or an inorganic group material such as silica, alumina, carbon, zirconia, the denatured forms thereof, or the like. In the case of inorganic hollow spheres, the surface thereof may be treated with a silane coupling agent or the like.

In view of the flexibility which results from the use of the hollow spheres per se, for example, the resulting reduction in weight of the coating layer, etc., it is preferable to use hollow spheres which have a shell of thermoplastic resin, especially a copolymer of vinylidene chloride and acrylonitrile. A diameter of 1–50 μm and a shell thickness of not larger than 0.5 μm for each hollow sphere are preferred in order to realize a thin and uniform coating layer having a thickness of 200 μm or less. Within these limits, the coating layer does not lose its smoothness.

Examples of energy-beam setting resin compositions, according to the present invention, include thermosetting resin, ultraviolet setting resin, electron-beam setting resin, and the like. Among the above-listed compositions, ultraviolet setting resin having a high setting speed is preferred because this resin forms coating at a high speed and requires no large sized setting apparatus. Examples of such energy-beam setting resins include, for example, silicone resin, epoxy resin, urethane resin, polyester resin, epoxy acrylate resin, urethane acrylate, acrylate fluoride, silicone acrylate, polyester acrylate, butadiene acrylate, or the like. The energy-beam setting resins which may be used are not particularly limited to this list of examples. Further, it is effective, in order to increase the stability and functional properties of coating resin, to add to the resin one or more of the following materials: a photoinitiator, a sensitizer, an antioxidant, a photo-stabilizer, a resin coupling agent, a surface treatment agent, a particle dispersant, or the like, all of which are generally added to materials of the kinds described above.

The ratio of the hollow spheres in the mixture to the energy-beam setting resin may be freely selected according to the hardness of the target coating layer desired. However, it is desirable to select the volume percent of the hollow spheres relative to the produced resin composition to be 30–70% in order to raise the break strength and to achieve the beneficial effects of the gas or liquid portions (hereinafter, referred to as pores) in the inside of the shells of the hollow spheres.

Further, for practical use, it is preferable to achieve a viscosity of the coating resin composition of within a range of 100–100,000 cps. It is particularly desirable to select the viscosity to be within the viscosity range of 1000–10,000 cps in order to easily perform the coating. Among the various kinds of energy-beam setting resins, an ultraviolet setting resin in which the viscosity can be freely selected is suitable for obtaining a resin coating composition which has a viscosity within the above viscosity range.

Although the coating thickness is not limited but can be freely selected in accordance with the target stress absorption effect, the target bulk density, and the like, it is desirable to select the thickness to be 500 μm or less in order to harden the energy-beam setting resin sufficiently.

According to the present invention, when the inside of a die is coated with energy-beam setting resin having low viscosity, the flowability of the resin inside the die is so excellent that problems with pressure distribution or the like are almost completely avoided.

Consequently, it is possible to overcome the problems of circumferential or longitudinal variations in outer diameter and variations in thickness which have been the problems in conventional production of a communication line material. Further, the flowability and surface tension of the resin are high because the resin contains not foam but hollow spheres.

Therefore, even if an under-layer of the resin has uneven portions or the like, it is easy to make the outer peripheral surface form a perfect circle which thereby makes it possible to always produce a communication line material having a predetermined outer diameter.

Moreover, since the hardening speed of energy-beam setting resin is high, the productivity can be improved. Furthermore, since the selection of the possible material compositions which can be used is large, material can be selected for particular qualities such as adhesion to an under-layer, the hardness of a coating layer, and the like.

According to the present invention, pores are formed by hollow spheres so that the concentration of pores (obtained from a difference in specific gravity between the resin containing hollow spheres and resin containing no hollow spheres), which is the concentration of hollow spheres, is set to a predetermined value. By means of these pores, the outer diameter of a line material can be set to a predetermined value, the problems of variation in thickness in line material can be alleviated, and a light-weight line material with a large surface area can be obtained.

Further, according to the present invention, it is possible to change the hardness of the whole coating layer by changing the specific concentrations of any of the various types of pores in the resin, each type having different physical properties, so that the transmission characteristics can be changed over a wide range.

The concentration of pores can be controlled not only by changing the quantity of hollow spheres but also by heating the hollow spheres so as to expand the spheres. It is desirable that such heating to expand the hollow spheres be performed simultaneously with an application of a setting energy-beam to the energy-beam setting resin in order to maintain the shape of the expanded hollow spheres.

A preferred embodiment of the process used to harden the resin coating comprises passing the ultraviolet setting resin coated material under an ultraviolet lamp, 30 cm in length, at a speed of 25 m/min.

Another preferred embodiment of the hardening process, which combines hardening with heating, comprises passing the ultraviolet setting resin coated material through an oven, 50 cm in length and with a temperature of 300° C. while either simultaneously with or immediately after the heating, applying ultraviolet light by means of a 30 cm ultraviolet lamp at a speed of 50 cm/min. In this embodiment, the oven may be, but is not limited to, an electric furnace or an infrared beam emitter. The infrared beam emitter functions with a resin composition which is able to generate heat upon exposure to an infrared beam.

EXAMPLES

The present invention will be described with reference to the following examples.

Figure 1B:
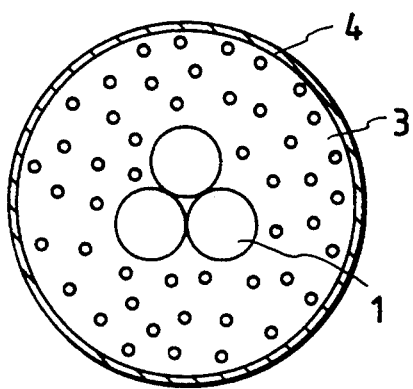
Figure 1C:
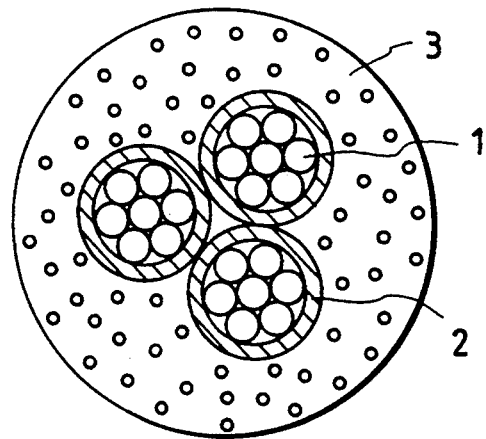
Figure 2:
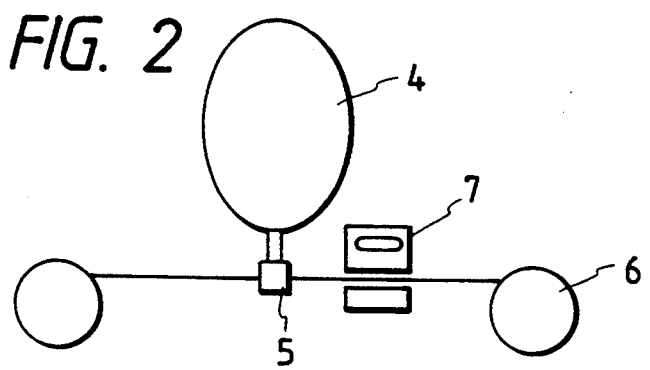
FIG. 2 is a diagram for explaining the producing process of the examples.

The diagrams (a), (b), and (c) of FIG. 1 show cross sections of the communication line materials related to Examples 1, 2, and 3.

EXAMPLE 1

Figure 4:
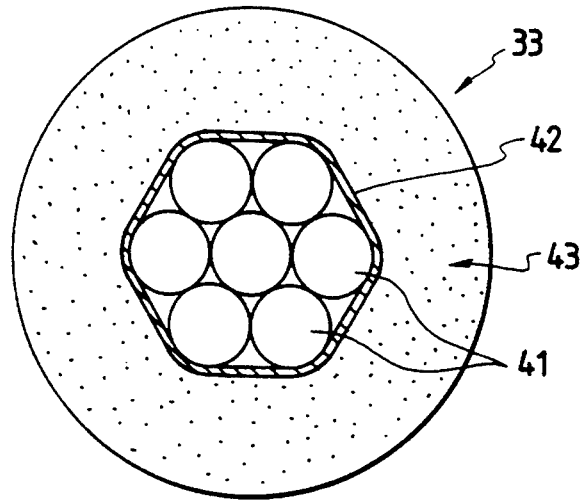
FIG. 4 is a cross section showing a communication line material according to the prior art.

Shown in the diagram (a) of FIG. 1 were seven optical fibers 1, which were arranged such that one central optical fiber was surrounded by six optical fibers and were extrusion-coated with an under-coating 2 of polypropylene (nylon, as well as the same ultraviolet setting resins used for the outer coating can also be used as under-coating) so as to have an outer diameter of 1 mm as in the case of FIG. 4 and a coating 3 of energy-beam setting resin with hollow spheres was formed on the under-coating 2.

In this case, Expan-Cell DU (registered trademark; produced by Chemanode Inc.) was used as the hollow sphere, in which isobutane was encapsulated by a shell of a vinylidene chloride-acrylonitrile copolymer. The hollow spheres were added and dispersed in ultraviolet setting resin (950×100: produced by Desoto Inc. in U.S.) containing urethane acrylate as a principal component with 50 volume percent, and the thus obtained composition was used as the energy-beam setting resin with hollow spheres.

The resin was hardened by passing it under an ultraviolet emission apparatus so that the outer diameter of the coating was formed to be 2 mm. The weight of the hollow sphere coating layer of the line material formed as described above was 1.2 g/m. Thus, the weight of the hollow sphere coating layer of the line material was light in comparison to the weight of the conventional light foam polyethylene layer.

The communication line material in this example had a difference between the maximum and minimum diameters at any particular place on the communication line of about 10 μm. This was in contrast to the conventional coating of foam polyethylene layer in which the outer diameters of the six outer optical fibers tended to become large and there was a difference of about 100 μm between the maximum and minimum diameters at any particular place on the communication line.

Further, in this example, the variation in thickness was very small, and a displacement between the center of the central optical fiber 1 and the center of the outer-circumferential circle of the outermost coating layer was a value of about 5 μm which was within the range of a measurement error.

Figure 5:
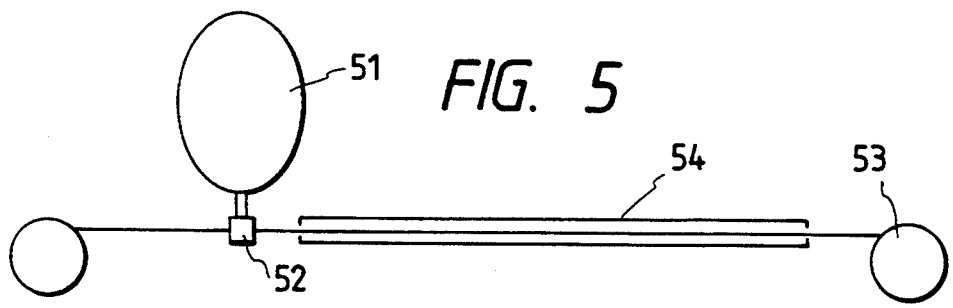
FIG. 5 is a diagram for explaining the producing process of the conventional communication line material.

Moreover, from the point of view of productivity, coating can be made at a line speed of 60 m/min or more in this example, while the line speed of coating with foam polyethylene layer in the conventional case is 10 m/sec. In the production method of this example, an ultraviolet lamp 7 is provided between a die 5 of a resin feeding machine 4 and a take-up machine 6. This method does not require the long cooling line which is used in the conventional method (see FIG. 5). Accordingly, it is possible to obtain remarkable reduction in space.

Further, with the method of this example, problems generated in conventional cooling lines, such as transformation due to contact with foreign matter, hang-down due to weight, variations in quantity of discharge caused by variations in tension due to vibrations, unbalance in thickness, etc., have been avoided.

EXAMPLE 2

The communication line material according to the diagram (b) of FIG. 1 was formed in such a manner that optical fibers 1, each having a diameter of 250 μm, were twisted together, the same energy-beam setting resin coating 3 with hollow spheres as that of the first example was formed on the optical fibers 1 so as to have an outer diameter of 1.6 mm, and the energy-beam setting resin coating 3 was coated with a smooth layer 4 having a thickness of 5 μm.

In this case, the coating of the smooth layer 4 was formed by adding silicone oil (SH-190 type, made by Toshiba Silicone Co., Ltd.) constituting 0.1 volume % of the same ultraviolet-ray setting resin as described above. By providing the smooth layer 4, it is possible to further enhance the ease with which the fluid-coated communication line material is laid under pressure through the duct line and to further improve the handling properties of the resin.

In this example, the three optical fibers 1, which were only twisted together and not undercoated were coated with energy-beam setting resin with hollow spheres. Even in the case of a cross section having a special shape, as shown in this example, an excellent coating layer can be formed because the viscosity of the resin is low. Further, since adhesion of foam polyethylene to another material is poor, it has been conventionally impossible to provide such a smooth layer 4 as in this example.

Figure 3:
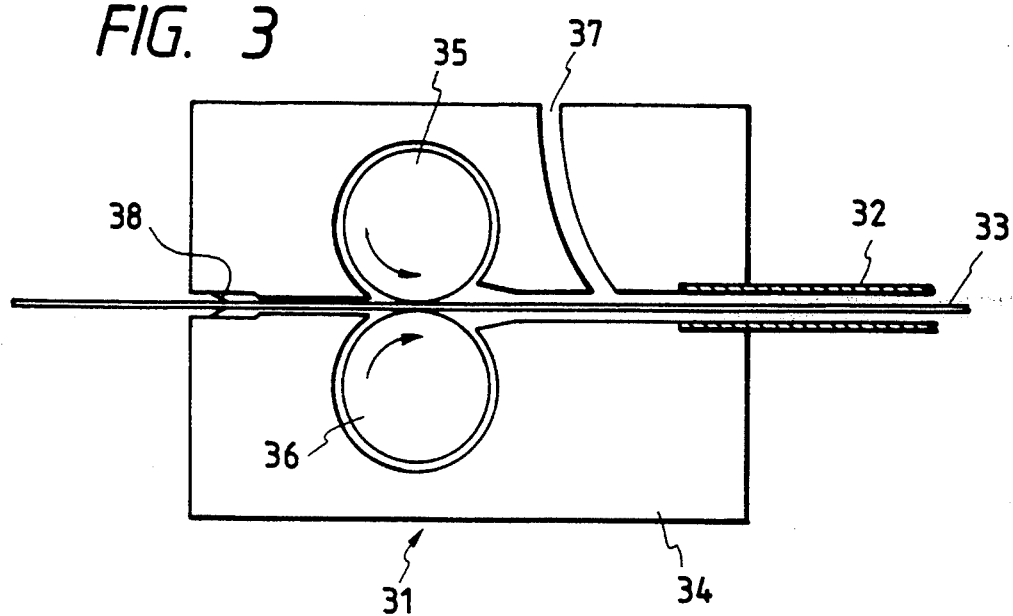
FIG. 3 is an explanatory diagram showing an example of a pressure sending apparatus.

When the communication line material according to this example (FIG. 1(a)) was sent by pressure into a polyethylene tube having an inner diameter of 6 mm by using compressed air having pressure of 5 kg/cm$^2$ from such an apparatus as shown in FIG. 3, insertion could be performed only up to 1200 m at the maximum. Further, when the communication line material coated with the smooth layer 4 (FIG. 1(b)) was pressure-sent in the same manner, pressure-sending could be performed only up to 1000 m at the maximum.

EXAMPLE 3

A communication line material according to diagram (c) of FIG. 1 was formed in such a manner that three bundles of fibers each composed of seven optical fibers 1 coated with an under-coating 2 of polypropylene in the same manner as in the first example and each having a diameter of 1 mm were brought together and collectively coated with a coating 3 of energy-beam setting resin with hollow spheres so as to have an outer diameter of 5 mm. Also in this case, a very excellent coating layer was formed.

EXAMPLE 4

In a further example, seven optical fibers 7 arranged as shown in the diagram (a) of FIG. 1 such that one central optical fiber 1 was surrounded by six other optical fibers 6 were extrusion-coated with an under-coating 2 of polypropylene as described above so as to have an outer diameter 2 of 1 mm. Then, the energy-beam setting resin with hollow spheres shown in the first example was applied over the under-coating 2, and irradiated with ultraviolet rays while applying heat in an oven at 300° C.

As a result, the hollow spheres were expanded by internal gas pressure during the process of hardening, and rapidly cooled when the material was taken out of the oven, so that the hollow spheres were fixed in the expanded state. At this time, the volume percent of the hollow spheres in the resin presumed from the ratio of the specific gravity of the coating material with hollow spheres before and after application of coating was 70 volume percent. When the thickness of the energy-beam setting resin was controlled so that the diameter of the coating layer was 2 mm, the weight of the coating layer including the hollow spheres could be reduced to 0.7 g/m which was smaller than that of Example 1.

Such a light-weight line material is extremely advantageous in the aspect of ease of insertion into a duct line, because the weight of a line material acts as resistance against insertion. Further, in the thus produced line material, since hollow spheres are expanded by heat from the surface, the state of expansion is distributed in the outward direction of thickness so that the structure is more dense as the position comes near to the central optical fiber. That is, since no longitudinally uneven force is exerted on the optical fibers and the surface is remarkably expanded so as to practically preclude the appearance of convex portions, therefore, the surface area which contacts with the duct line is decreased and the surface area for receiving a carrying force is increased.

What we claim is:

1. A communication line material comprising:
   a fiber or a group of fibers;
   an under-coating surrounding said fiber or group of fibers; and
   an outer coating surrounding said under-coating, said outer coating comprising a mixture of an energy-beam setting resin and a plurality of heat-expanding, fluid-encapsulating hollow spheres.

2. A communication line material according to claim 1 wherein said energy-beam setting resin is selected from the group consisting of: thermosetting resin, ultraviolet setting resin, and electron-beam setting resin.

3. A communication line material according to claim 1 wherein said energy-beam setting resin is selected from the group consisting of: silicone resin, epoxy resin, urethane resin, polyester resin, epoxy acrylate resin, urethane acrylate, and butadiene acrylate.

4. A communication line material according to claim 1 wherein said hollow spheres encapsulate fluid selected from the group consisting of: air, nitrogen, argon, and isobutane.

5. A communication line material according to claim 1 wherein said hollow spheres comprise a polymeric outer shell.

6. A communication line material according to claim 5 wherein said outer shell comprises a copolymer of vinylidene chloride and acrylonitrile.

7. A communication line material according to claim 5 wherein said hollow spheres have a diameter of 1 to 50 $\mu$m and a shell thickness of not larger than 0.5 $\mu$m.

8. A communication line material according to claim 1 wherein the mixture contains 30 to 70 volume percent of the hollow spheres.

9. A communication line material according to claim 1 wherein the mixture further comprises a silicone oil to facilitate formation of a smooth outer surface.

10. A communication line material according to claim 1 wherein the mixture additionally comprises a photo-initiator.

* * * * *